Figure 1:
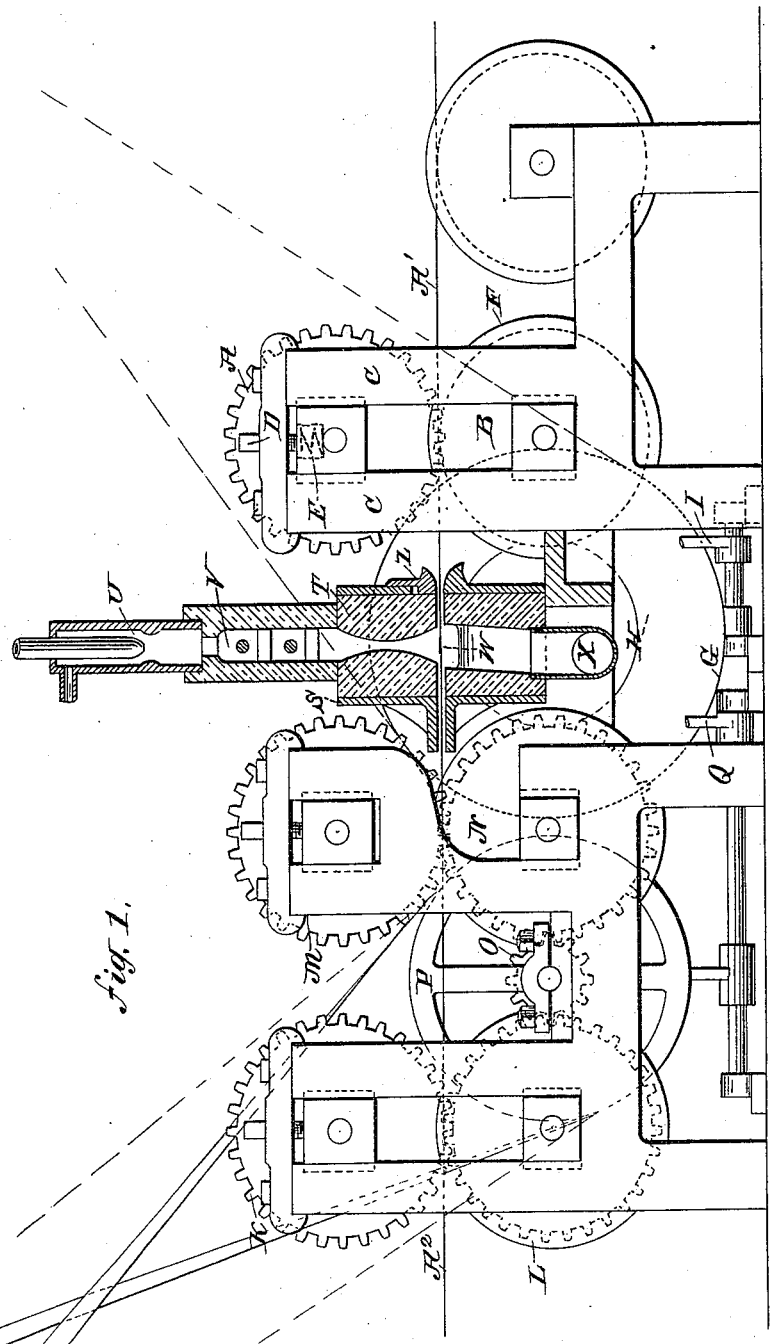

(No Model.)

2 Sheets—Sheet 1.

J. B. ROOT.
WELDING MACHINE.

No. 346,614.

Patented Aug. 3, 1886.

Witnesses:
Robt. F. Gaylord,
Robt. H. Duncan

Inventor
John B. Root
by Saml. A. Duncan
Atty.

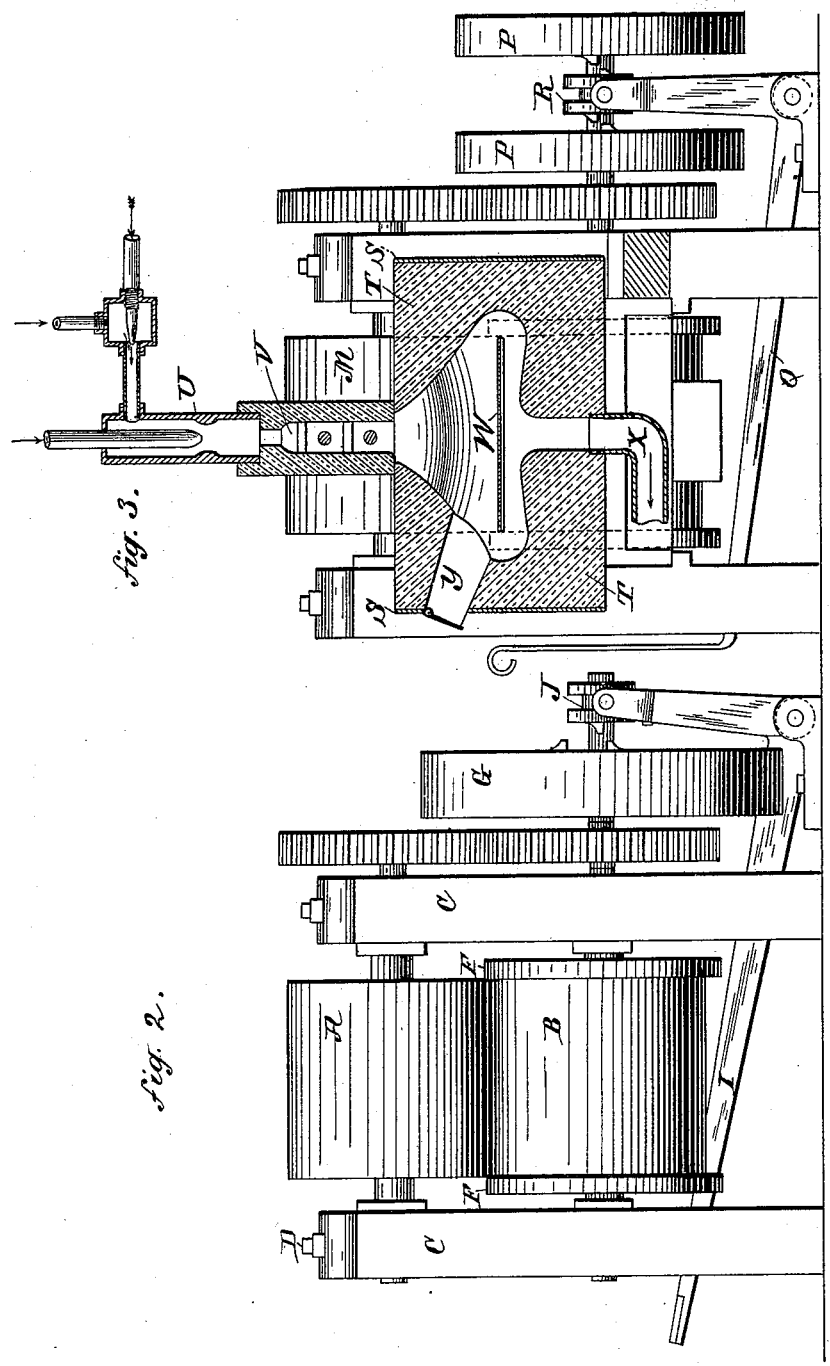

United States Patent Office.

JOHN B. ROOT, OF PORT CHESTER, NEW YORK.

WELDING-MACHINE.

SPECIFICATION forming part of Letters Patent No. 346,614, dated August 3, 1886.

Application filed July 18, 1884. Renewed November 9, 1885. Again renewed July 2, 1886. Serial No. 206,970. (No model.)

*To all whom it may concern:*

Be it known that I, JOHN B. ROOT, of Port Chester, in the county of Westchester and State of New York, have invented certain new and useful Improvements in Machines for Welding Pipe-Blanks, of which the following is a full, clear, and exact description thereof, as will enable those skilled in the art to make and use the same.

The commercial or market form of common sheet or plate iron is usually flat strips or sheets of convenient length and various widths. In manufacturing such sheet-iron, and especially in making it up into spirally-formed pipe or tubing, it is desirable to make the tubing from a continuous blank, and it is therefore necessary to provide means for uniting end to end the short strips or sheets of the market form, or the strips cut from them, to produce the desired continuous lengths. When the spiral pipe that is being made is welded at its seams, the pieces composing the continuous blank should likewise be welded together, and it is for this latter purpose that the herein-described machine is particularly constructed.

The invention consists, therefore, in suitable feeding mechanism, heating devices, and welding mechanism, so arranged as to weld together the ends of sheet-metal sheets or strips.

Figure 1 of the drawings shows in elevation a machine embodying my improvements, with the furnace in central vertical section. Fig. 2 is an end view from the right of Fig. 1; and Fig. 3 is a vertical cross-section through the furnace, looking toward the left.

A and B represent a pair of feed-rolls which are supported in the housing-frame C. These rolls are made yielding relatively and their pressure governed by any suitable means—such as the screw D and the spring E. (Shown in dotted lines.) One of these rolls is also flanged, as shown at F, for the purpose of keeping the strips in proper position, and they are geared together so as to have the same speed, and G is the main wheel from which these rolls are driven by gear H, I being a lever for operating the clutch mechanism J, that connects and disconnects the rolls from the main wheel.

K and L indicate a pair of rolls, similar in all respects to the rolls A B, and for the same purpose.

M and N are the welding-rolls. They are similar in construction to the feed-rolls; but instead of coming close together, as do the feed-rolls, so as to take hold upon the blanks, they are set slightly apart—that is, such a distance as corresponds to the thickness to which it is desired to reduce the welded parts, which usually is about the same as the thickness of the blanks. The roll N meshes with the gear H on the main driving-wheel, and also with the gear O on the shaft of the oppositely-driven driving-wheels P P. Roll L likewise meshes with this gear O, so that the whole train of rolls are simultaneously moved from the driving-wheel. A treadle, Q, acting upon clutch R, puts it within the operator's power to give the train of rolls motion in either direction.

S is the shell of the heating chamber or furnace, and T represents the refractory material of the interior of the furnace.

U is a blow-pipe, and V its combustion-chamber, by which the requisite heat is produced. From this blow-pipe the heating-jet is driven through the throat of the furnace directly upon the overlapping ends W of the blank, the products of combustion being carried off through the pipe X.

Y is a peep-hole, through which to observe the position and condition of the blanks, and Z is a sliding door for closing the opening by which the blanks enter the furnace after the blanks have been properly adjusted for heating.

After the ends of the blanks $A'$ $A^2$ have been sufficiently heated, they being during the heating in the position of overlapping shown at W, the whole train of rolls is put into rapid motion by the main driving-wheel and the heated ends of the blank quickly welded together by the action of the welding-rolls. If desired, the motion of the rolls is reversed, and the weld run back and forth between the welding-rolls until the lapping ends that compose it are rolled down to the desired thickness.

I have here shown but one blow-pipe, but in some cases it may be desirable to use more than one.

The blow-pipe shown in the drawings forms the subject-matter of a special application for patent therefor, filed by me in the United States Patent Office June 11, 1884, and now pending, and therefore is not here specifically described or claimed.

What is claimed as new is—

1. In a machine for joining flat blanks together end to end, the combination of mechanism for advancing the blanks, a heating-jet arranged to apply a welding-heat to the overlapping ends of the separate blanks, and mechanism for applying the requisite pressure to weld the heated parts together.

2. In a machine for joining together flat sheet-metal blanks end to end, the combination of guide-rolls for advancing the blanks, a heating-jet arranged to apply a welding-heat to the overlapping ends of the separate blanks, and rolls for applying a welding-pressure to the heated parts of the blanks.

3. In a machine for welding together flat sheet-metal blanks, the combination of guide-rolls for advancing the blank, a heating-jet arranged to apply a welding-heat to the overlapping ends of the separate blanks, rolls for applying a welding-pressure to the heated parts of the blank, and mechanism for changing at will the direction of the motion of said rolls, for the purpose of repeatedly rolling the blanks.

JOHN B. ROOT.

Witnesses:
ROBT. F. GAYLORD,
ROBT. H. DUNCAN.